(12) United States Patent
Nowak et al.

(10) Patent No.: US 10,696,917 B2
(45) Date of Patent: *Jun. 30, 2020

(54) LOW-FRICTION FLUORINATED COATINGS

(71) Applicant: HRL Laboratories, LLC, Malibu, CA (US)

(72) Inventors: Andrew P. Nowak, Los Angeles, CA (US); Adam F. Gross, Santa Monica, CA (US); Elena Sherman, Culver City, CA (US)

(73) Assignee: HRL Laboratories, LLC, Malibu, CA (US)

( * ) Notice: Subject to any disclaimer, the term of this patent is extended or adjusted under 35 U.S.C. 154(b) by 469 days.

This patent is subject to a terminal disclaimer.

(21) Appl. No.: 15/073,615

(22) Filed: Mar. 17, 2016

(65) Prior Publication Data

US 2016/0201005 A1 Jul. 14, 2016

Related U.S. Application Data

(63) Continuation-in-part of application No. 14/829,640, filed on Aug. 19, 2015, which is a
(Continued)

(51) Int. Cl.
*C08G 18/50* (2006.01)
*C10M 169/04* (2006.01)
(Continued)

(52) U.S. Cl.
CPC ..... *C10M 169/041* (2013.01); *C08G 18/3812* (2013.01); *C08G 18/4804* (2013.01);
(Continued)

(58) Field of Classification Search
CPC ............ C08G 18/3812; C08G 18/5015; C08G 18/4804; C08G 18/6505
See application file for complete search history.

(56) References Cited

U.S. PATENT DOCUMENTS 3,435,003 A 3/1969 Craven
3,810,874 A 5/1974 Mitsch et al.
(Continued)

FOREIGN PATENT DOCUMENTS

EP 1558661 B1 12/2012
JP 2014231585 A1 12/2014
(Continued)

OTHER PUBLICATIONS

Ashish Vaidya and Manoj K. Chaudhury, "Synthesis and Surface Properties of Environmentally Responsive Segmented Polyurethanes," Journal of Colloid and Interface Science 249, 235-245 (2002).
(Continued)

*Primary Examiner* — Michael L Leonard
(74) *Attorney, Agent, or Firm* — O'Connor & Company; Ryan P. O'Connor

(57) ABSTRACT

Low-friction fluorinated coatings are disclosed herein. A preferred low-friction material contains a low-surface-energy fluoropolymer having a surface energy between about 5 mJ/m² to about 50 mJ/m², and a hygroscopic material that is covalently connected to the fluoropolymer in a triblock copolymer, such as PEG-PFPE-PEG. The material forms a lubricating surface layer in the presence of humidity. An exemplary copolymer comprises fluoropolymers with average molecular weight from 500 g/mol to 20,000 g/mol, wherein the fluoropolymers are ($\alpha,\omega$)-hydroxyl-terminated and/or ($\alpha,\omega$)-amine-terminated, and wherein the fluoropolymers are present in the triblock structure T-($CH_2$—$CH_2$—O)—$CH_2$—$CF_2$—O—($CF_2$—$CF_2$—O)$_m$($CF_2$—O)$_n$—$CF_2$—$CH_2$—(O—$CH_2$—$CH_2$)$_p$-T where T is a hydroxyl or amine terminal group, p=1 to 50, m=1 to 100, and n=1 to 100. The copolymer also contains isocyanate species and polyol or polyamine chain extenders or crosslinkers pos-
(Continued)

sessing a functionality of preferably 3 or greater. These durable, solvent-resistant, and transparent coatings reduce insect debris following impact.

11 Claims, 3 Drawing Sheets

Related U.S. Application Data continuation-in-part of application No. 14/658,188, filed on Mar. 14, 2015.

(60) Provisional application No. 62/271,193, filed on Dec. 22, 2015, provisional application No. 62/038,878, filed on Aug. 19, 2014, provisional application No. 61/953,093, filed on Mar. 14, 2014.

(51) Int. Cl.

| | | |
|---|---|---|
| *C08G 18/66* | (2006.01) | |
| *C09D 175/08* | (2006.01) | |
| *C08G 65/34* | (2006.01) | |
| *C10M 107/44* | (2006.01) | |
| *C10M 147/04* | (2006.01) | |
| *C08G 81/00* | (2006.01) | |
| *C08G 81/02* | (2006.01) | |
| *C08G 18/75* | (2006.01) | |
| *C10M 107/38* | (2006.01) | |
| *C10M 149/20* | (2006.01) | |
| *C08G 18/65* | (2006.01) | |
| *C08G 18/48* | (2006.01) | |
| *C08G 18/38* | (2006.01) | |

(52) U.S. Cl.
CPC ..... *C08G 18/5015* (2013.01); *C08G 18/6505* (2013.01); *C08G 18/6666* (2013.01); *C08G 18/758* (2013.01); *C08G 65/34* (2013.01); *C08G 81/00* (2013.01); *C08G 81/025* (2013.01); *C09D 175/08* (2013.01); *C10M 107/38* (2013.01); *C10M 107/44* (2013.01); *C10M 147/04* (2013.01); *C10M 149/20* (2013.01); *C10M 2201/062* (2013.01); *C10M 2201/084* (2013.01); *C10M 2201/103* (2013.01); *C10M 2201/105* (2013.01); *C10M 2213/0606* (2013.01); *C10M 2217/0453* (2013.01); *C10N 2220/021* (2013.01); *C10N 2230/04* (2013.01); *C10N 2230/06* (2013.01); *C10N 2250/121* (2013.01)

(56) References Cited

U.S. PATENT DOCUMENTS

| | | | |
|---|---|---|---|
| 3,847,978 A | 11/1974 | Sianesi et al. | |
| 4,777,224 A | 10/1988 | Gorzynski et al. | |
| 4,956,438 A | 9/1990 | Ruetman et al. | |
| 5,032,666 A | 7/1991 | Hu et al. | |
| 5,084,315 A | 1/1992 | Karimi et al. | |
| 5,189,135 A | 2/1993 | Cozzi et al. | |
| 5,332,798 A * | 7/1994 | Ferreri | C08G 18/10 528/61 |
| 5,589,552 A | 12/1996 | Simeone et al. | |
| 6,071,564 A | 6/2000 | Marchetti et al. | |
| 6,579,835 B2 * | 6/2003 | Scicchitano | C08G 18/0814 508/446 |
| 6,926,937 B2 | 8/2005 | Extrand et al. | |
| 6,992,132 B2 | 1/2006 | Trombetta et al. | |
| 7,358,306 B2 * | 4/2008 | Turri | C08G 18/10 525/126 |
| 7,655,310 B2 | 2/2010 | Trombetta | |
| 2003/0166769 A1 * | 9/2003 | Trombetta | C08G 18/0814 524/589 |
| 2004/0019143 A1 | 1/2004 | Koloski et al. | |
| 2005/0164010 A1 | 7/2005 | Trombetta | |
| 2008/0219944 A1 | 9/2008 | Longo et al. | |
| 2010/0324205 A1 | 12/2010 | Maier et al. | |
| 2011/0218290 A1 | 9/2011 | Webster et al. | |
| 2011/0213085 A1 | 11/2011 | Tonelli et al. | |
| 2012/0039648 A1 * | 2/2012 | Sambhy | G03G 15/2057 399/333 |
| 2012/0164565 A1 | 6/2012 | Qiu | |
| 2013/0041089 A1 * | 2/2013 | Forgione | C08G 18/0804 524/507 |
| 2013/0165618 A1 * | 6/2013 | Brust | C08G 18/4854 528/26 |
| 2015/0158969 A1 | 6/2015 | Nowak | |
| 2015/0329453 A1 | 11/2015 | Guarda et al. | |
| 2015/0361280 A1 | 12/2015 | Reynolds et al. | |

FOREIGN PATENT DOCUMENTS

| | | | | |
|---|---|---|---|---|
| WO | 2013158360 A1 | 10/2013 | | |
| WO | WO-2014067715 A1 * | 5/2014 | | B41M 7/0045 |

OTHER PUBLICATIONS

Siochi et al., "Engineered Surfaces for Mitigation of Insect Residue Adhesion" NF1676L-15481 SAMPE 2013; May 6-9, 2013; Long Beach, CA; United States.

Wohl et al., "Evaluation of commercially available materials to mitigate insect residue adhesion on wing leading edge surfaces," Progress in Organic Coatings 76 (2013) 42-50.

Kok et al., "Influence of surface characteristics on insect residue adhesion to aircraft leading edge surfaces," Progress in Organic Coatings 76 (2013) 1567-1575.

Lee et al., "Zwitter-Wettability and Antifogging Coatings with Frost-Resisting Capabilities," ACS Nano 7 (2013) 2172-2185.

Chen et al., "Robust Prototypical Anti-icing Coatings with a Self-lubricating Liquid Water Layer between Ice and Substrate," ACS Appl. Mater. Interfaces 5 (2013) 4026-4030.

Turri et al., "Waterborne Anionomeric Polyurethane—Ureas from Functionalized Fluoropolyethers," Journal of Applied Polymer Science, vol. 93, 136-144 (2004).

Dou et al., "Anti-icing Coating with an Aqueous Lubricating Layer," ACS Appl. Mater. Interfaces 2014, 6, 6998-7003.

Wang et al., "Investigation of the role of hydrophilic chain length in amphiphilic perfluoropolyether/poly(ethylene glycol) networks: towards high-performance antifouling coatings," Biofouling vol. 27, No. 10, Nov. 2011, 1139-1150.

Chen et al., "A Thermally Re-mendable Cross-Linked Polymeric Material," Science 295 (5560), 1698-1702, Mar. 1, 2002.

Oster et al., "Photoreduction of Metal Ions by Visible Light," DepartmenOTF Chemistry, Polytechnic Institute of Brooklyn, 135th National meeting of the American Chemical Society, Nov. 5, 1959.

Wojtecki et al., "using the dynamic bond to access macroscopically responsive structurally dynamic polymers," Nature Materials vol. 10, Jan. 2011.

* cited by examiner (a)

(b)

LOW-FRICTION FLUORINATED COATINGS

PRIORITY DATA

This patent application is a continuation-in-part of U.S. patent application Ser. No. 14/829,640, filed on Aug. 19, 2015, which in turn is a continuation-in-part of U.S. patent application Ser. No. 14/658,188, filed on Mar. 14, 2015, each of which is hereby incorporated by reference herein. This patent application also claims priority to U.S. Provisional Patent App. No. 62/271,193, filed on Dec. 22, 2015, which is hereby incorporated by reference herein.

FIELD OF THE INVENTION

The present invention generally relates to low-friction and low-adhesion materials, coatings, and systems.

BACKGROUND OF THE INVENTION

Coatings and materials can become soiled from debris (particles, insects, oils, etc.) impacting the surface. The debris affects airflow over the surface as well as aesthetics and normally is removed by washing. Insect impact residue affects vehicle fuel economy, aesthetics, and operator vision. On aircraft, insect residue interferes with airflow over a surface, increasing drag and thus fuel consumption. On automobiles, the light dispersion of headlights, operator vision through the windshield, and aesthetic appeal are degraded from insect remains.

Many solutions to reduce insect debris, such as mechanical scrapers, sacrificial continually released liquid layers, and passive coatings with engineered topology have been flight tested. However, the best-performing liquid layer release systems add a large size and weight penalty while the durability of nanostructured surfaces on aircraft or automobile surfaces is unproven. Attempts to mitigate insect accumulation during the early days of aircraft development included mechanical scrapers, deflectors, traps, in-flight detachable surfaces, in-flight dissolvable surfaces, viscous surface fluids, continuous washing fluids, and suction slots. The results of most of these trials were determined ineffective or impractical for commercial use.

One approach to this problem is to create a passive, self-cleaning surface that removes debris from itself by controlling chemical interactions between the debris and the surface. Passive coatings that reduce insect debris are desirable because they have less parasitic mass and do not require the wiring and energy of active systems. No commercial coating provides sufficient residue reduction. While superhydrophobic surfaces perform well in laboratory testing, their limited durability due to fragile asperities and high solid filling fractions are barriers to adoption. In contrast, currently used highly durable aircraft and automotive coatings are lightly filled polymer systems.

Recently, Wohl et al., "Evaluation of commercially available materials to mitigate insect residue adhesion on wing leading edge surfaces,"*Progress in Organic Coatings* 76 (2013) 42-50 describe work at NASA to create anti-insect adhesion or "bugphobic" surfaces. Wohl et al. tested the effect of organic-based coatings on insect adhesion to surfaces, but the coatings did not fully mitigate the issue. Wohl et al. also describe previously used approaches to reduce bug adhesion such as mechanical scrapers, deflectors, paper and/or other coverings, elastic surfaces, soluble films, and washing the surface continually with fluid.

Superhydrophobic and superoleophobic surfaces create very high contact angles (>150°) between the surface and drops of water and oil, respectively. The high contact angles result in the drops rolling off the surface rather than remaining on the surface. These surfaces do not repel solid foreign matter or vapors of contaminants. Once soiled by impact, debris will remain on the surface and render it ineffective. Also, these surfaces lose function if the nanostructured top surface is scratched.

Enzyme-filled coatings leech out enzymes that dissolve debris on the surface. However, enzymes are quickly depleted and cannot be refilled, rendering this approach impractical.

Kok et al., "Influence of surface characteristics on insect residue adhesion to aircraft leading edge surfaces,"*Progress in Organic Coatings* 76 (2013) 1567-1575, describe various polymer, sol-gel, and superhydrophobic coatings tested for reduced insect adhesion after impact. The best-performing materials were high-roughness, superhydrophobic surfaces. However, they did not show that debris could be removed from the superhydrophobic surfaces once insects broke on the surface.

Polymeric materials having low surface energies are widely used for non-stick coatings. These materials are tailored with careful control of their chemical composition (thus surface energy) and mechanical properties. Polymers containing low-energy perfluoropolyethers and perfluoroalkyl groups have been explored for low adhesion and solvent repellency applications. While these low-energy polymers facilitate release of materials adhering to them in both air and water, they do not necessarily provide a lubricated surface to promote clearance of foreign substances. See Vaidya and Chaudhury, "Synthesis and Surface Properties of Environmentally Responsive Segmented Polyurethanes,"*Journal of Colloid and Interface Science* 249, 235-245 (2002). A fluorinated polyurethane is described in U.S. Pat. No. 5,332,798 issued Jul. 26, 1994 to Ferreri et al.

Fluoropolymer sheets or treated surfaces have low surface energies and thus low adhesion force between foreign matter and the surface. However, friction between impacting debris and the surface results in the sticking of contaminants.

Fluorofluid-filled surfaces have very low adhesion between impacting debris and the surface. However, if any of the fluid is lost, the surface cannot be refilled/renewed once applied on the vehicle, and thus loses its properties (see Wong et al., "Bioinspired self-repairing slippery surfaces with pressure-stable omniphobicity,"*Nature* 477, 443-447, 2011).

In view of the shortcomings in the art, improved coating materials and systems, and compositions suitable for these systems, are needed. In particular, what is desired commercially is a highly durable, low-friction coating to reduce drag and improve visibility. Passive coatings that reduce insect debris are desirable because they have less parasitic mass and do not require the wiring and energy of active systems.

SUMMARY OF THE INVENTION

The present invention addresses the aforementioned needs in the art, as will now be summarized and then further described in detail below.

Some variations provide a copolymer composition comprising:

(a) fluoropolymers having an average molecular weight from about 500 g/mol to about 20,000 g/mol, wherein the fluoropolymers are ($\alpha,\omega$)-hydroxyl-terminated and/or ($\alpha,\omega$)-amine-terminated, and wherein the fluoropolymers are present in the triblock structure:

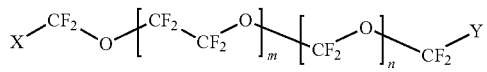

wherein:
X, Y=CH$_2$—(O—CH$_2$—CH$_2$)$_p$-T, and X and Y are independently selected;
p=1 to 50;
T is a hydroxyl or amine terminal group;
m=1 to 100; and
n=1 to 100;
 (b) one or more isocyanate species possessing an average isocyanate functionality of about 2 or greater, or a reacted form thereof; and
 (c) one or more polyol or polyamine chain extenders or crosslinkers possessing an average functionality of about 3 or greater, or a reacted form thereof.

In some embodiments, the fluoropolymers have an average molecular weight from about 1,000 g/mol to about 10,000 g/mol.

X and Y may be the same or different. That is, the end groups X and Y may differ in terminal group or in the p value. In some embodiments, p is selected from 6 to 50, independently for each of X and Y. In certain embodiments, p is selected from 10 to 20, independently for each of X and Y.

The isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extenders or crosslinkers may be selected from the group consisting of glycerol, trimethylolpropane, 1,2,6-hexanetriol, triethanolamine, pentaerythritol, N,N,N',N'-tetrakis(2-hydroxypropyl) ethylenediamine, and homologues, derivatives, or combinations thereof.

In some embodiments, the composition contains, in a hard segment, the reacted form of the one or more isocyanate species, combined with the reacted form of the one or more polyol or polyamine chain extenders or crosslinkers.

The copolymer composition may be present in a coating. In some embodiments, the coating is characterized by a coefficient of friction less than 0.5. In these or other embodiments, the coating is optically transparent.

Other variations of the invention provide a low-friction material comprising:
a substantially continuous matrix containing a first component; and
a plurality of inclusions containing a second component, wherein the inclusions are dispersed within the matrix;
wherein one of the first component or the second component is a low-surface-energy fluoropolymer having a surface energy between about 5 mJ/m$^2$ to about 50 mJ/m$^2$, and the other of the first component or the second component is a hygroscopic material that is covalently connected to the fluoropolymer in a triblock copolymer,
and wherein the material forms a lubricating surface layer in the presence of humidity.

The fluoropolymer may be selected from the group consisting of polyfluoroethers, perfluoropolyethers, polyfluoroacrylates, polyfluorosiloxanes, and combinations thereof.

The hygroscopic material may be selected from the group consisting of poly(acrylic acid), poly(ethylene glycol), poly (2-hydroxyethyl methacrylate), poly(vinyl imidazole), poly (2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

In some embodiments, the fluoropolymer is perfluoropolyether and the hygroscopic material is poly(ethylene glycol). The triblock copolymer may be

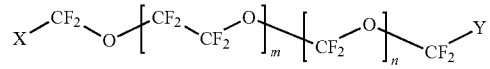

wherein:
X, Y=CH$_2$—(O—CH$_2$—CH$_2$)$_p$-T, and X and Y are independently selected;
p=6 to 50;
T is a hydroxyl or amine terminal group;
m=1 to 100; and
n=1 to 100.

In some embodiments, the continuous matrix further contains (i) one or more isocyanate species possessing an average isocyanate functionality of about 2 or greater, or a reacted form thereof and (ii) one or more polyol or polyamine chain extenders or crosslinkers possessing an average functionality of about 2 or greater, or a reacted form thereof.

The isocyanate species may be selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

The polyol or polyamine chain extenders or crosslinkers may be selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis (2-hydroxypropyl) ethylenediamine, and homologues, derivatives, or combinations thereof.

In preferred embodiments, the one or more polyol or polyamine chain extenders or crosslinkers possess an average functionality of about 3 or greater, and the triblock copolymer is

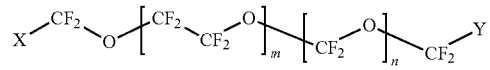

wherein:
X, Y=CH$_2$—(O—CH$_2$—CH$_2$)$_p$-T, and X and Y are independently selected;
p=1 to 50;
T is a hydroxyl or amine terminal group;
m=1 to 100; and
n=1 to 100.

The low-surface-energy polymer and/or the hygroscopic material may be surface-treated. In some embodiments, the material further comprises one or more additional components selected from the group consisting of a particulate filler, a pigment, a dye, a plasticizer, a flame retardant, a flattening agent, and a substrate adhesion promoter. The particulate filler (when present) may be selected from the group consisting of silica, alumina, silicates, talc, aluminosilicates, barium sulfate, mica, diatomite, calcium carbonate, calcium sulfate, carbon, wollastonite, and combinations thereof; and wherein the particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof.

The low-friction material may be characterized by a water absorption capacity of at least 10 wt % water based on total weight of the material. The low-friction material may further be characterized by a surface contact angle of water of greater than 90°. In these or other embodiments, the low-friction material is characterized by a coefficient of friction less than 0.5, such as less than 0.2. In any of these embodiments, the low-friction material may be optically transparent.

Certain variations of the invention provide a fluoropolymer having an average molecular weight from about 500 g/mol to about 20,000 g/mol, wherein the fluoropolymer is present in the triblock structure:

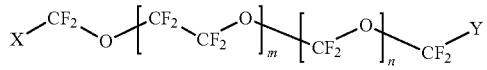

wherein:
$X=CH_2-(O-CH_2-CH_2)_{p1}$-T;
$Y=CH_2-(O-CH_2-CH_2)_{p2}$-T;
X and Y are independently selected and p1 and p2 are independently selected;
either {p1=6 to 50 and p2=0 to 50}, or {p1=0 to 50 and p2=6 to 50};
T is a hydroxyl or amine terminal group;
m=1 to 100; and
n=1 to 100.

DETAILED DESCRIPTION OF EMBODIMENTS OF THE INVENTION

Figure 1:
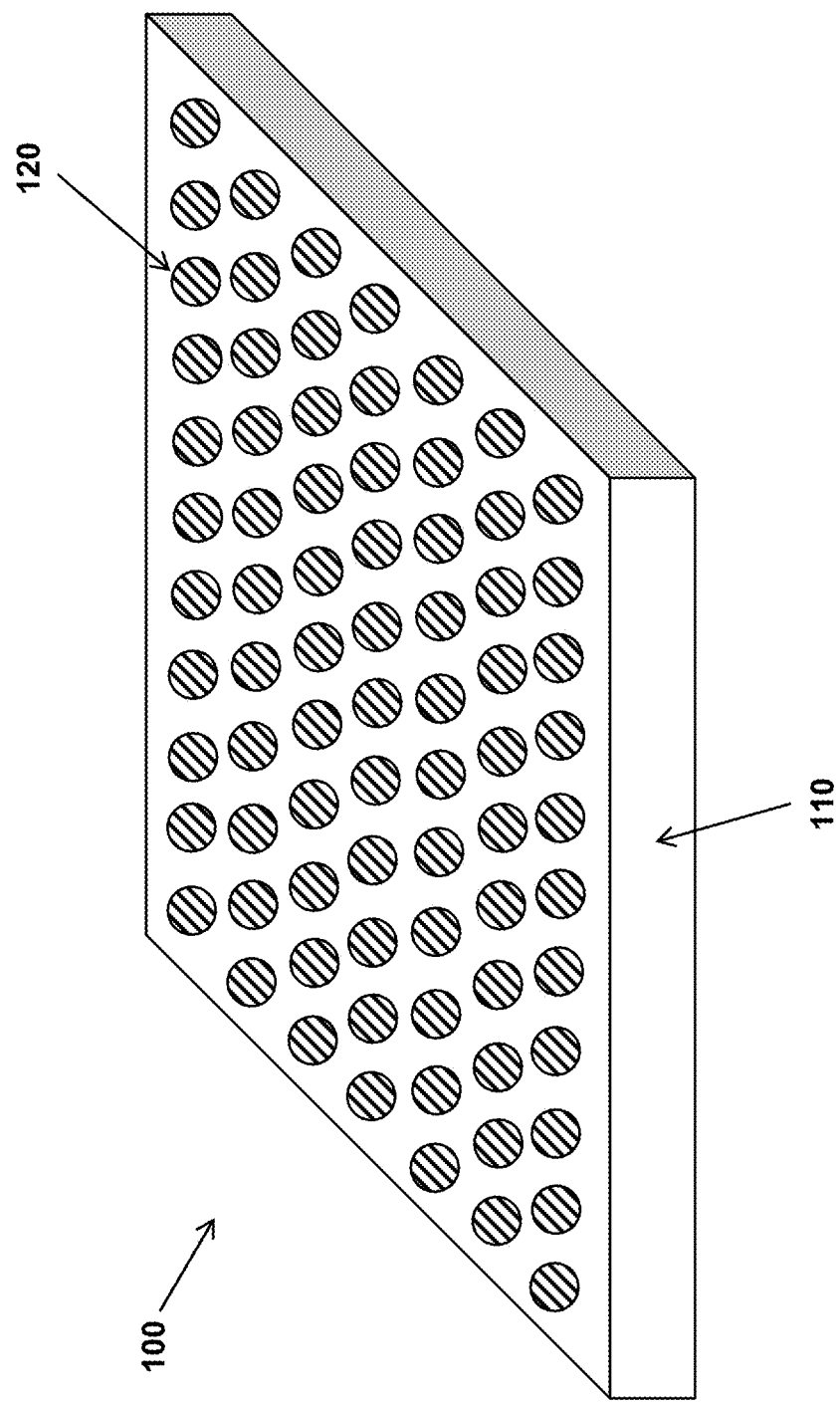
FIG. 1 depicts the structure of some variations of the invention, providing a low-friction material.

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Some variations of this invention are premised on the discovery of a material that possesses both low surface energy (for low adhesion) and the ability to absorb water. A structured material or coating, as disclosed, passively absorbs water from the atmosphere to create a lubrication/self-cleaning layer and to reduce the friction and adhesion of the impacting body (such as an insect) on the surface. The material may be used as a coating or as a surface.

Earlier embodiments provide combinations of fluorinated and hygroscopic precursors that demonstrate the ability to microphase-separate into discrete islands of fluoropolymer or hygroscopic-rich domains. This system produced excellent performance in freezing-delay reduction and reduced coefficient of friction.

It has now been discovered that the second soft segment (non-fluorinated polyether or polyester) may be removed, so that the material includes only a first fluoro-containing soft segment within the soft-segment phase of the overall polymer. In some preferred embodiments, the soft segment is a (α,ω)-hydroxy functional triblock copolymer with PFPE as a central block and PEG on the outer arms.

Embodiments described herein incorporate both the fluoropolymer (e.g., perfluoropolyether, PFPE, as a preferred species) and hygroscopic polymer (e.g., poly(ethylene glycol), PEG, as a preferred species) into a single triblock copolymer precursor with the PFPE as the central region and the PEG blocks on each end of the PFPE. It has been discovered that films cured with this precursor are exceptionally clear, tough, and solvent-resistant.

When transparent coatings are desired, all elements may be polymerized at once (one-shot method) rather than using a sequential prepolymer technique. By incorporating both fluoropolymer and hygroscopic precursors intimately together in the network though one-shot polymerization, opaque microphase-separated structures near the length scale of the wavelength of light are avoided, thus improving transparency.

The disclosed material can absorb water from the air and use this water as a lubricant to wash and remove debris from the surface. The surface contains domains of a low-surface-energy polymer (such as, but not limited to, a fluoropolymer) providing low adhesion, and domains of a hygroscopic material. Atmospheric water is thus captured as a lubricant and is a continually available, renewable resource.

By reducing friction, the debris is less likely to embed in or otherwise attach to the surface and instead will slough off the surface, particularly under the shear forces from air moving over a vehicle surface. Debris may be organic or inorganic and may include insects, dirt, dust, soot, ash, pollutants, particulates, ice, seeds, plant or animal fragments, plant or animal waste products, combinations or derivatives of any of the foregoing, and so on. The coating in some embodiments may be characterized as "bugphobic," which is intended to mean the coating has relatively low adhesion with an impacting bug. Some embodiments provide a durable, all-polymer, insect-debris-reducing coating.

Some variations provide a low-friction material that creates a lubricated absorbed water layer on a low-surface-energy coating. This material is formed by coupling hygroscopic and fluorinated materials, which typically repel each other, into a polymer network. By controlling the length scale and amount of these antagonistic chemistries (high/low contact angle and low/high water absorption), the desired low wetting and adhesion of one material (fluorinated component) is coupled with the desired water absorption of the other (hygroscopic material).

This system differs from previous work that relied on purely hydrophilic films to create a liquid water layer on a surface. The hydrophobicity of the coatings provided herein is important for reducing adhesion and wetting of insect debris. Furthermore, this system is different from previous work that relied on trapping non-aqueous fluids on surfaces to lower adhesion. While slippery liquid-infused porous surfaces provide low adhesion from a fluorinated fluid trapped in a porous surface layer, such surfaces cannot extract more fluid from the environment, to counteract fluid loss. In contrast, the hygroscopic component (as disclosed herein) extracts fluid from the environment during rain or frosting, to counteract fluid loss.

In addition, materials provided herein contain large variations in wetting across the surface at <10 μm length scales—arising from low-surface-energy domains closely juxtaposed with high-surface-energy domains. These small length scales are similar to the air-versus-solid variation on known superhydrophobic surfaces exhibiting low insect-impact debris accumulation. In this respect it is noted that although there is no surface roughness, variations in wetting at 1-10 μm length scales (or less) can reduce insect debris adhesion, in some embodiments.

In some variations, low-friction and low-adhesion structures are created by a heterogeneous microstructure comprising a low-surface-energy polymer that is interspersed with hygroscopic domains (lubricating inclusions). Debris impacting the surface has low adhesion energy with the surface, due to the presence of the low-surface-energy polymer, and the debris will not remain on the surface.

Preferred embodiments employ fluoropolymers, without limitation of the invention, as described in more detail below. One technique to compatibilize fluoropolymers and hygroscopic materials is the use of segmented polyurethane or urea systems. These species demonstrate strong hydrogen bonding potential between them and as a result can create strong associative forces between the chains. In order to produce elastomeric materials, regions of highly flexible and weakly interacting chains (soft segments) must be incorporated with strongly associating elements (hard segments) and this can be provided in a segmented copolymerization scheme. Segmented copolymers provide a straightforward synthetic route toward block architectures using segments with vastly differing properties. Such synthesis results in chains that possess alternating hard and soft segments composed of regions of high urethane bond density and the chosen soft segment component (e.g., fluoropolymer and/or hygroscopic element), respectively. This covalent linkage of dissimilar hard and soft blocks drives the systems to microphase separation and creates regions of flexible soft blocks surrounding regions of hard blocks. The associative forces among the hard segments prevent flow under stress and can produce elastomeric materials capable of displaying high elongation and tensile strength.

In a specific embodiment of the disclosure, there is provided a copolymer composition. The composition comprises one or more α,ω (alpha, omega)-amine-terminated or α,ω (alpha, omega)-hydroxyl-terminated polyfluoropolymer soft segments having an average molecular weight of between about 500 grams per mole to about 20,000 grams per mole. The exemplary composition optionally further comprises one or more polyethylene glycol second soft segments having an average molecular weight of between about 500 grams per mole to about 10,000 grams per mole. A total content of the soft segments is present in an amount of from about 40% by weight to about 90% by weight, based on a total weight percent of the composition. The composition further comprises one or more hard segments present in an amount of from about 15% by weight to about 50% by weight, based on the total weight percent of the composition, for example. The one or more hard segments comprise a combination of one or more isocyanate species and one or more low-molecular-weight polyol or polyamine chain extenders or crosslinkers.

Some variations of the invention provide a copolymer composition comprising:

(a) fluoropolymers having an average molecular weight from about 500 g/mol to about 20,000 g/mol, wherein the fluoropolymers are (α,ω)-hydroxyl-terminated and/or (α,ω)-amine-terminated, and wherein the fluoropolymers are present in the triblock structure:

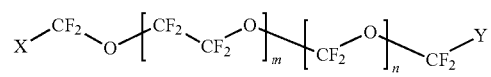

wherein:

X, Y=CH$_2$—(O—CH$_2$—CH$_2$)$_p$-T, and X and Y are independently selected;

p=6 to 50;

T is a hydroxyl or amine terminal group;

m=1 to 100; and n=1 to 100;

(b) one or more isocyanate species, or a reacted form thereof, possessing an isocyanate functionality of 2 or greater; and (c) one or more polyol or polyamine chain extenders or crosslinkers, or a reacted form thereof.

The X and Y terminal PEG chains may be the same or different. In certain embodiments, X and Y are different. In some of these embodiments, X and Y differ in the terminal group T. For example, X may be terminated with a hydroxyl group and Y may be terminated with an amine group. Or X and Y may be terminated with different types of amine groups. In these or other embodiments, the p value (chain length) may be the same or different between X and Y.

It is also noted that in certain embodiments wherein X has one p value and Y has a different p value, the p value of one of X or Y may be selected from 0 to 50, while the p value of the other of X or Y (on the other end of the fluoropolymer) is selected from 6 to 50. Stated another way, in certain embodiments, X and Y may be selected such that X=CH$_2$—(O—CH$_2$—CH$_2$)$_{p1}$-T and Y=CH$_2$—(O—CH$_2$—CH$_2$)$_{p2}$-T wherein either {p1=6 to 50 and p2=0 to 50} or {p1=0 to 50 and p2=6 to 50}.

Certain variations of the invention provide a fluoropolymer having an average molecular weight from about 500 g/mol to about 20,000 g/mol, wherein the fluoropolymer is present in the triblock structure:

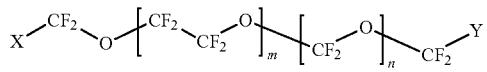

wherein:

X=CH$_2$—(O—CH$_2$—CH$_2$)$_{p1}$-T;

Y=CH$_2$—(O—CH$_2$—CH$_2$)$_{p2}$-T;

X and Y are independently selected and p1 and p2 are independently selected;

either {p1=6 to 50 and p2=0 to 50}, or {p1=0 to 50 and p2=6 to 50};

T is a hydroxyl or amine terminal group;

m=1 to 100; and n=1 to 100.

It is noted that (α,ω)-terminated polymers are terminated at each end of the polymer. The α-termination may be the same or different than the ω-termination. Also it is noted that in this disclosure, "(α,ω)-termination" includes branching at the ends, so that the number of terminations may be greater than 2 per polymer molecule. The polymers herein may be linear or branched, and there may be various terminations and functional groups within the polymer chain, besides the end (α,ω) terminations.

In some embodiments, the fluoropolymers are present in the triblock structure T-(CH$_2$—CH$_2$—O)—CH$_2$—CF$_2$—O—(CF$_2$—CF$_2$—O)$_m$(CF$_2$—O)$_n$—CF$_2$—CH$_2$—(O—CH$_2$—CH$_2$)$_p$-T where T is a hydroxyl or amine terminal group, p=6 to 50, m=1 to 100, and n=1 to 100. Note that the molecular structures depicted in this patent application are not intended to be limiting with respect to bond angles or three-dimension orientation.

Optionally, the soft-segment phase containing the fluoropolymers, or an additional soft-segment phase, contains one or more second soft segments selected from polyesters or polyethers, wherein the polyesters or polyethers are (α,ω)-hydroxyl-terminated and/or (α,ω)-amine-terminated. When the second soft segments are present, the molar ratio of second soft segments to first soft segments (fluoropolymers) may be less than 2.0, such as about 0.1 to about 1.5. In various embodiments, the molar ratio of the second soft segments to the first soft segments is about 0, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0.

In this description, "polyurethane" is a polymer comprising a chain of organic units joined by carbamate (urethane) links, where "urethane" refers to N(H)—(C=O)—O—. Polyurethanes are generally produced by reacting an isocyanate containing two or more isocyanate groups per molecule with one or more polyols containing on average two or more hydroxyl groups per molecule, in the presence of a catalyst.

Polyols are polymers in their own right and have on average two or more hydroxyl groups per molecule. For example, α,ω-hydroxyl-terminated perfluoropolyether is a type of polyol.

"Isocyanate" is the functional group with the formula —N=C=O. For the purposes of this disclosure, S—C(=O)—N(H)—R is considered a derivative of isocyanate.

"Polyfluoroether" refers to a class of polymers that contain an ether group—an oxygen atom connected to two alkyl or aryl groups, where at least one hydrogen atom is replaced by a fluorine atom in an alkyl or aryl group.

"Perfluoropolyether" (PFPE) is a highly fluorinated subset of polyfluoroethers, wherein all hydrogen atoms are replaced by fluorine atoms in the alkyl or aryl groups.

"Polyurea" is a polymer comprising a chain of organic units joined by urea links, where "urea" refers to N(H)—(C=O)—N(H)—. Polyureas are generally produced by reacting an isocyanate containing two or more isocyanate groups per molecule with one or more multifunctional amines (e.g., diamines) containing on average two or more amine groups per molecule, in the presence of a catalyst.

A "chain extender or crosslinker" is a compound (or mixture of compounds) that links long molecules together and thereby completes a polymer reaction. Chain extenders or crosslinkers are also known as curing agents, curatives, or hardeners. In polyurethane/urea systems, a curative is typically comprised of hydroxyl-terminated or amine-terminated compounds which react with isocyanate groups present in the mixture. Diols as curatives form urethane linkages, while diamines as curatives form urea linkages. The choice of chain extender or crosslinker may be determined by end groups present on a given prepolymer. In the case of isocyanate end groups, curing can be accomplished through chain extension using multifunctional amines or alcohols, for example. Chain extenders or crosslinkers may have an average functionality greater than 2 (such as 3 or greater), i.e. beyond diols or diamines. In various embodiments, the chain extenders or crosslinkers possess an average functionality of about 2.1, 2.2, 2.3, 2.4, 2.5, 2.6, 2.7, 2.8, 2.9, 3.0, 3.1, 3.2, 3.3, 3.4, 3.5, or more.

Linear thermoplastic elastomers provide fluid-resistant PFPE blocks, but the overall solvent resistance of these materials does not meet the threshold required for many applications. In contrast, the use of a single triblock with PFPE blocks disposed with PEG outer blocks, combined with a multifunctional crosslinker having a functionality of 3 or more produces highly fluid-resistant coatings. Such a crosslinked copolymer provides thermoset polymer properties such as solvent resistance, chemical resistance, heat resistance, and structural integrity.

The one or more chain extenders or crosslinkers (or reaction products thereof) may be present in a concentration, in the copolymer composition, from about 0.01 wt % to about 10 wt %, such as about 0.05 wt % to about 1 wt %.

As meant herein, a "low-surface-energy polymer" means a polymer, or a polymer-containing material, with a surface energy of no greater than 50 mJ/m². The principles of the invention may be applied to low-surface-energy materials with a surface energy of no greater than 50 mJ/m², in general (i.e., not necessarily limited to polymers).

In some embodiments, the low-surface-energy polymer includes a fluoropolymer, such as (but not limited to) a fluoropolymer selected from the group consisting of polyfluoroethers, perfluoropolyethers, fluoroacrylates, fluorosilicones, and combinations thereof.

In these or other embodiments, the low-surface-energy polymer includes a siloxane. A siloxane contains at least one Si—O—Si linkage. The low-surface-energy polymer may consist of polymerized siloxanes or polysiloxanes (also known as silicones). One example is polydimethylsiloxane.

In some embodiments, the fluoropolymers are selected from the group consisting of perfluoropolyethers, polyfluoroacrylates, polyfluorosiloxanes, and combinations thereof. In certain embodiments, the fluoropolymers include a fluoropolymer copolymer with poly(ethylene glycol) having the structure:

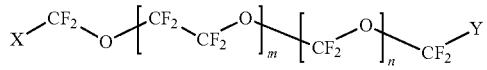

wherein:
X, Y=CH$_2$—(O—CH$_2$—CH$_2$)$_p$-T, and X and Y are independently selected;
p=6 to 50;
T is a hydroxyl or amine terminal group;
m=1 to 100; and
n=1 to 100;

In this structure, one or more F atoms (but less than all F atoms) may be replaced by H atoms or other atoms or groups. For example, without limitation, the F atoms that are not present in square brackets (i.e., the chains with extents of polymerization m or n) may be replaced with hydrogen atoms, without significantly impacting the final properties of the fluoropolymer or a copolymer containing it.

When present as second soft segments or within the first soft segments, the polyesters or polyethers may be selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

In some embodiments, the isocyanate species is selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis (phenyl isocyanate), isophorone diisocyanate, and combinations or derivatives thereof.

The polyol or polyamine chain extenders or crosslinkers may be selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane (also known as 1,1,1-tris(hydroxymethyl)propane), 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis(2-hydroxypropyl) ethylenediamine, and homologues, derivatives, or combinations thereof.

Some variations provide a copolymer composition comprising:

(a) fluoropolymers having an average molecular weight from about 500 g/mol to about 20,000 g/mol, wherein the fluoropolymers are (α,ω)-hydroxyl-terminated and/or (α,ω)-amine-terminated, and wherein the fluoropolymers are present in the triblock structure:

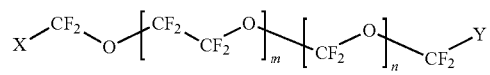

wherein:
X, Y=CH$_2$—(O—CH$_2$—CH$_2$)$_p$-T, and X and Y are independently selected;
p=1 to 50;
T is a hydroxyl or amine terminal group;
m=1 to 100; and
n=1 to 100;

(b) one or more isocyanate species possessing an average isocyanate functionality of about 2 or greater, or a reacted form thereof; and (c) one or more polyol or polyamine chain extenders or crosslinkers possessing an average functionality of about 3 or greater, or a reacted form thereof.

X and Y may be the same or different. That is, the end groups X and Y may differ in terminal group or in the p value. In some embodiments, p is selected from 6 to 50, independently for each of X and Y. In certain embodiments, p is selected from 10 to 20, independently for each of X and Y.

In preferred embodiments, the one or more polyol or polyamine chain extenders or crosslinkers possess an average functionality of about 3 or greater, and the triblock copolymer is

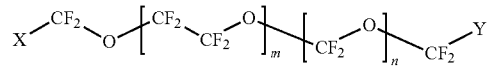

wherein:
X, Y=CH$_2$—(O—CH$_2$—CH$_2$)$_p$-T, and X and Y are independently selected;
p=1 to 50;
T is a hydroxyl or amine terminal group;
m=1 to 100; and
n=1 to 100.

Following a suitable chemical reaction, the copolymer composition contains, in a hard segment, a reacted form of the one or more isocyanate species, combined with a reacted form of the one or more polyol or polyamine chain extenders or crosslinkers. In some embodiments, the hard segment is present in an amount from about 5 wt % to about 60 wt %, based on total weight of the composition.

The copolymer composition may be present in a coating, for example. Such a coating may be characterized by a contact angle of water on a coating surface of greater than 90°.

The structure of some variations of the invention is shown in FIG. 1, which depicts the structure of a coating or surface with low-friction and self-cleaning properties.

The structure 100 of FIG. 1 includes a continuous matrix 110. A "continuous matrix" (or equivalently, "substantially continuous matrix") means that the matrix material is present in a form that includes chemical bonds among molecules of the matrix material. An example of such chemical bonds is crosslinking bonds between polymer chains. The structure 100 further includes a plurality of inclusions 120, intimately dispersed within the matrix 110, each of the inclusions 120 being or comprising a hygroscopic material. In preferred embodiments, the inclusions 120 are covalently bonded with the matrix 110 in a copolymer, such as the fluoropolymer copolymer with poly(ethylene glycol) depicted structurally above.

In the structure 100, there may be present various defects, cracks, broken bonds, impurities, additives, and so on. Optionally, the continuous matrix 110 and/or the inclusions 120 may further comprise one or more additives selected from the group consisting of fillers, colorants, UV absorbers, defoamers, plasticizers, viscosity modifiers, density modifiers, catalysts, and scavengers.

Note that the functions of the matrix and inclusions may be reversed, such that the matrix provides hygroscopic properties while the inclusions provide low surface energy. That is, in the case of a fluoropolymer copolymer with poly(ethylene glycol), the PEG phase may be regarded as the matrix and the fluoropolymer phase may be regarded as the inclusions, depending on the magnitude of m, n, and p values in the copolymer. Large p and small m and n values would tend to make the PEG phase the matrix, while small p values and large m and n values would tend to make the fluoropolymer phase the matrix.

Some variations provide a low-friction material (e.g., coating or bulk material) comprising:

a substantially continuous matrix containing a first component;

a plurality of inclusions containing a second component, wherein the inclusions are dispersed within the matrix;

wherein one of the first component or the second component is a low-surface-energy polymer having a surface energy between about 5 mJ/m$^2$ to about 50 mJ/m$^2$, and the other of the first component or the second component is a hygroscopic material, and wherein the continuous matrix and the inclusions form a lubricating surface layer in the presence of humidity.

In some embodiments, the surface energy of the low-surface-energy polymer is between about 10 mJ/m$^2$ to about 40 mJ/m$^2$, such as about 10, 15, 20, 25, 30, 35, or 40, mJ/m$^2$. In some preferred embodiments, the low-surface-energy polymer is a fluoropolymer selected from the group consisting of polyfluoroethers, perfluoropolyethers, polyfluoroacrylates, polyfluorosiloxanes, and combinations thereof.

The hygroscopic material may be selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

In certain embodiments, the hygroscopic material is also classified as a hydrophilic material. A hygroscopic substance will actively attract and absorb water. A hydrophilic substance is one where water will preferentially wet the surface, demonstrated by contact angles <90°.

The inclusions are three-dimensional domains, which may be of any shape, geometry, or aspect ratio. The inclusions may be geometrically symmetric or asymmetric. In some embodiments, the inclusions are anisotropic. As meant herein, "anisotropic" inclusions have at least one chemical or physical property that is directionally dependent. When measured along different axes, an anisotropic inclusion will have some variation in a measurable property. The property may be physical (e.g., geometrical) or chemical in nature, or both.

The inclusions may be characterized as templates, domains, or regions. In some embodiments, the inclusions are phase-separated as discrete, non-continuous regions dispersed in the continuous matrix. In other embodiments, the inclusions are either not phase-separated or are phase-separated at a very small length scale, such as about 20, 10, 5, 4, 3, 2, 1 μm or less (including below the wavelength of light). In some low-friction, low-adhesion materials, the low-surface-energy polymer and the hygroscopic material are covalently connected in a block copolymer, in which the inclusions and the continuous matrix are distinct phases of the block copolymer. The hygroscopic inclusions may be dispersed uniformly within the continuous matrix. The continuous matrix may form a continuous framework in the coating, in certain embodiments.

As intended herein, a "block copolymer" means a copolymer containing a linear arrangement of blocks, where each block is defined as a portion of a polymer molecule in which the monomeric units have at least one constitutional or configurational feature absent from the adjacent portions. Several types of block copolymers are generally possible, including AB block copolymers, ABA block copolymers, ABC block copolymers, segmented block copolymers, and random copolymers.

A wide range of concentrations of components may be present in the low-friction material. For example, the continuous matrix may be from about 5 wt % to about 95 wt %, such as from about 10 wt % to about 50 wt % of the material. The inclusions may be from about 1 wt % to about 90 wt %, such as from about 10 wt % to about 50 wt % of the coating.

Within the component containing the low-surface-energy polymer, the low-surface-energy polymer may be from about 50 wt % to 100 wt %, such as about 60, 70, 80, 90, 95, or 100 wt %. Within the component containing the hygroscopic material, the hygroscopic material may be from about 50 wt % to 100 wt %, such as about 60, 70, 80, 90, 95, or 100 wt %.

The low-surface-energy polymer and/or the hygroscopic material may be surface-treated, such as to adjust hydrophobicity. The low-friction material optionally further contains one or more additional components selected from the group consisting of a particulate filler, a pigment, a dye, a plasticizer, a flame retardant, a flattening agent, and a substrate adhesion promoter.

A particulate filler may be selected from the group consisting of silica, alumina, silicates, talc, aluminosilicates, barium sulfate, mica, diatomite, calcium carbonate, calcium sulfate, carbon, wollastonite, and combinations thereof. The particulate fillers generally are in the size range of about 5 nm to about 10 μm, such as about 20 nm to 2 μm.

The particulate fillers may be surface-modified with a compound selected from the group consisting of fatty acids, silanes, silicones, alkyl phosphonates, alkyl phosphonic acids, alkyl carboxylates, and combinations thereof. Optionally, the fillers may be surface-modified with a hydrophobic material, such as (but not limited to) an alkylsilane, a fluoroalkylsilane, and/or an alkyldisilazane (e.g., hexamethyldisilazane).

In some embodiments, the low-friction material further includes voids. As intended herein, a "void" is a discrete region of empty space, or space filled with air or another gas, that is enclosed within the continuous matrix. The voids may be open (e.g., interconnected voids) or closed (isolated within the continuous matrix), or a combination thereof. The voids may partially surround inclusions.

The low-friction material may be characterized by a water absorption capacity of at least 10 wt % water based on total weight of the low-friction material. The material is characterized, according to some embodiments, by a water absorption capacity of at least 1, 2, 3, 4, 5, 6, 7, 8, or 9 wt % water, preferably at least 10, 11, 12, 13, 14, 15, 16, 17, 18, 19, or 20 wt % water, based on total weight of the material.

The low-friction material may be characterized by a surface contact angle of water of greater than 90° (hydrophobic). The material may also be hydrophilic, i.e. characterized by an effective contact angle of water that is less than 90°. In various embodiments, the material is characterized by an effective contact angle of water of about 70°, 75°, 80°, 85°, 90°, 95°, 100°, or higher.

The low-friction material may also be lipophobic or partially lipophobic in some embodiments. In various embodiments, the low-friction material is characterized by an effective contact angle of hexadecane (as a measure of lipophobicity) of about 50°, 55°, 60°, 65°, 70°, 75°, 80°, 85°, 90°, or higher.

The low-friction material may simultaneously have hydrophobic and lipophobic properties. In certain embodiments, the material is characterized by an effective contact angle of water of at least 90° (such as about 95-100°) and simultaneously an effective contact angle of hexadecane of at least 60° (such as about 65°). In certain embodiments, the low-friction material is characterized by an effective contact angle of water of at least 80° (such as about 80-85°) and simultaneously an effective contact angle of hexadecane of at least 70° (such as about 75-80°).

In some embodiments, the low-friction material is characterized by a coefficient of friction, measured at 40-55% (e.g. 50%) relative humidity and room temperature, less than 1, 0.9, 0.8, 0.7, 0.6, 0.5, 0.4, 0.3, or 0.2. In these or other embodiments, the low-friction material is characterized by a coefficient of friction, measured at 85-90% relative humidity and room temperature, less than 0.8, 0.7, 0.6, 0.5, 0.4, 0.3, or 0.2.

The coefficient of friction is relatively low due to the presence of a lubricating surface layer in the presence of humidity. By a "lubricating surface layer in the presence of humidity," it is meant a layer, multiple layers, a partial layer, or an amount of substance that lubricates a substrate such that it has a lower coefficient of friction compared to the substrate without the material present.

The specific level of humidity is not regarded as critical, but in general may range from about 1% to 100%, typically about 30% to about 70% relative humidity. Relative humidity is the ratio of the water vapor density (mass per unit volume) to the saturation water vapor density. Relative humidity is approximately the ratio of the actual partial pressure of water vapor to the saturation (maximum) vapor pressure of water in air.

The substance that lubricates the substrate is primarily water, but it should be noted that other components from the environment may be present in the lubricating surface layer, including oils, metals, dust, dissolved gases, dissolved aqueous components, suspended non-aqueous components, fragments of debris, fragments of polymers, and so on.

In various embodiments, the low-friction material is a coating and/or is present at a surface of an object or region. The low-friction material may be utilized in relatively small applications, such as lens coatings, or for large structures, such as aircraft wings. In principle, the low-friction material could be present within a bulk region of an object or part, or could contain a temporary, protective laminating film for storage or transport, which is later removed to adhere to the vehicle, for example.

Separate fluoropolymer and hygroscopic precursors create microphase-separated domains to absorb water from the air and use this water as a lubricant to wash and remove debris from the surface. The atmospheric water lubricant is a continually available/renewable resource. The domains of hygroscopic material exist throughout the material and the anti-adhesion function is retained even after abrasion of the top layer of the material. Due to the length scale of phase separation typically seen in these materials (~1-10 μm), they strongly scatter light and are characteristically opaque.

However, employing a single precursor that combines a PFPE internal block with PEG outer blocks (arms) in a single functionalized triblock copolymer preserves the functions provided by the PFPE and PEG blocks, but microphase-separated at much lower length scales. In some embodiments, these lower length scales are below the wavelength of visible light (400-700 nm) to produce a coating with high clarity.

Transparency is the physical property of allowing light to pass through a material without being scattered. When light waves of strike an object (such as a particle in a coating), the electrons in the atoms of the object begin vibrating. If the object is transparent, then the vibrations of electrons are passed on to neighboring atoms through the bulk of the material and reemitted on the opposite side of the object. Such frequencies of light waves are said to be transmitted. If the object is opaque, then the vibrations of the electrons are not passed from atom to atom through the bulk of the material. Rather the electrons of atoms on the material's surface vibrate for short periods of time and then reemit the energy as a reflected light wave. Such frequencies of light are said to be reflected. The degree of transparency can be characterized a fraction of incoming light—having certain wavelengths, such as from 400 nm to 900 nm—that is transmitted through a given object (such as a coating). Transparent materials are also translucent, allowing light to pass through a material diffusely; however, translucent materials are not necessarily transparent.

A clear low-friction coating provided herein may be characterized by a coating transparency of at least 70% light transmission at one or more wavelengths in the range of 400 nm to 900 nm. In some embodiments, the coating transparency is at least 75%, at least 80%, at least 85%, at least 90%, at least 95%, or at least 99% light transmission at one or more wavelengths in the range of 400 nm to 900 nm (e.g, 589 nm). Note that these coating transparencies are measured through the entire coating thickness, not to a defined test depth.

When additives are incorporated into a low-friction material, the additives may be selected so that they will not scatter light and render the material opaque, when a clear coating is desired. In another approach to accomplish transparency, particulate additives are selected with an average particle size less than about 40-50 nm.

In some embodiments, variation in the index of refraction between particles is minimized. That is, if multiple types (chemical composition or geometry) of additives are employed, they should all have similar index of refraction. The index of refraction of the additives may be, for example, from about 1.2 to about 1.8, such as about 1.4, about 1.5, or about 1.6. Also, the index of refraction of the continuous matrix may be similar to the index of refraction of the additives. The index of refraction of the continuous matrix may be, for example, from about 1.2 to about 1.8, such as about 1.4, about 1.5, or about 1.6.

Variations of the invention also provide a precursor material for a low-friction material, the precursor material comprising:

a hardenable material capable of forming a substantially continuous matrix containing a first component; and a plurality of inclusions containing a second component, wherein the inclusions are dispersed within the hardenable material, wherein one of the first component or the second component is a low-surface-energy polymer having a surface energy between about 5 mJ/m$^2$ to about 50 mJ/m$^2$, and the other of the first component or the second component is a hygroscopic material.

In some embodiments, the surface energy of the low-surface-energy polymer is between about 10 mJ/m$^2$ to about 40 mJ/m$^2$, such as about 10, 15, 20, 25, 30, 35, or 40, mJ/m$^2$. In some embodiments, the low-surface-energy polymer is a fluoropolymer, such as one selected from the group consisting of polyfluoroethers, perfluoropolyethers, polyfluoroacrylates, polyfluorosiloxanes, and combinations thereof.

In some embodiments, the hygroscopic material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

The low-surface-energy polymer and the hygroscopic material may be covalently connected, or capable of being covalently connected, in a block copolymer comprising:

(a) fluoropolymers having an average molecular weight from about 500 g/mol to about 20,000 g/mol, wherein the fluoropolymers are (α,ω)-hydroxyl-terminated and/or (α,ω)-amine-terminated, and wherein the fluoropolymers are present in the triblock structure:

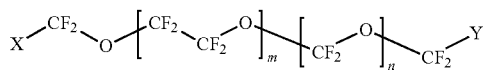

wherein:
X, Y=CH$_2$—(O—CH$_2$—CH$_2$)$_p$-T, and X and Y are independently selected;
p=6 to 50;
T is a hydroxyl or amine terminal group;
m=1 to 100; and
n=1 to 100;

(b) one or more isocyanate species, or a reacted form thereof, possessing an isocyanate functionality of 2 or greater; and (c) one or more polyol or polyamine chain extenders or crosslinkers, or a reacted form thereof.

In some embodiments of precursor materials, polyesters or polyethers are selected from the group consisting of poly(oxymethylene), poly(ethylene glycol), poly(propylene glycol), poly(tetrahydrofuran), poly(glycolic acid), poly(caprolactone), poly(ethylene adipate), poly(hydroxybutyrate), poly(hydroxyalkanoate), and combinations thereof.

The low-surface-energy polymer and/or the hygroscopic material may be surface-treated, either prior to introduction into the precursor material or prior to conversion of the precursor material to the low-friction material.

The precursor material may further contain one or more additional components selected from the group consisting of a particulate filler, a pigment, a dye, a plasticizer, a flame retardant, a flattening agent, and a substrate adhesion promoter. Alternatively, or additionally, such additional components may be introduced during the conversion of the precursor material to the low-friction material, or to the low-friction material after it is formed.

Specific particulate fillers include, for example, silica, alumina, silicates, talc, aluminosilicates, barium sulfate, mica, diatomite, calcium carbonate, calcium sulfate, carbon, wollastonite, and combinations thereof. The particulate fillers generally are in the size range of about 5 nm to about 2 μm, such as about 25 nm to 900 nm.

The particulate fillers may be surface-modified with a compound selected from the group consisting of fatty acids, silanes, silicones, alkyl phosphonates, alkyl phosphonic acids, alkyl carboxylates, and combinations thereof. Optionally, the fillers may be surface-modified with a hydrophobic material, such as (but not limited to) an alkylsilane, a fluoroalkylsilane, and/or an alkyldisilazane (e.g., hexamethyldisilazane).

Any known methods to fabricate these materials or coatings may be employed. Notably, these materials or coatings may utilize synthesis methods that enable simultaneous deposition of components or precursor materials to reduce fabrication cost and time. In particular, these materials or coatings may be formed by a one-step process, in some embodiments. In other embodiments, these materials or coatings may be formed by a multiple-step process.

The low-friction material, in some embodiments, is formed from a precursor material (or combination of materials) that may be provided, obtained, or fabricated from starting components. The precursor material is capable of hardening or curing in some fashion, to form a substantially continuous matrix along with a plurality of inclusions, dispersed within the matrix. The precursor material may be a liquid; a multiphase liquid; a multiphase slurry, emulsion, or suspension; a gel; or a dissolved solid (in solvent), for example.

The low-surface-energy polymer and the hygroscopic material may initially be in the same phase or in different phases. In some embodiments, the low-surface-energy polymer is in liquid or dissolved form while the hygroscopic material is in dissolved-solid or suspended solid form. In some embodiments, the low-surface-energy polymer is dissolved-solid or suspended-solid form while the hygroscopic material is in liquid or dissolved form. In some embodiments, the low-surface-energy polymer and the hygroscopic material are both in liquid form. In some embodiments, the low-surface-energy polymer and the hygroscopic material are both in dissolved (solvent) form.

Certain preferred embodiments employ one-shot polymerization to produce the copolymer composition. In one-shot polymerization, the reactants (fluoropolymer, isocyanate species, and polyol or polyamine chain extenders or cross-linkers) are mixed together in the liquid phase in a suitable container, within a mold, or on a substrate, and allowed to react simultaneously. No prepolymer is first formed. One-shot polymerization is especially preferable when transparent coatings are desirable.

In some variations of the invention, a material or coating precursor is applied to a substrate (such as a surface of an automobile or aircraft) and allowed to react, cure, or harden to form a final coating, wherein the material, coating precursor, or final coating contains a copolymer composition comprising:

(a) fluoropolymers having an average molecular weight from about 500 g/mol to about 20,000 g/mol, wherein the fluoropolymers are ($\alpha,\omega$)-hydroxyl-terminated and/or ($\alpha,\omega$)-amine-terminated, and wherein the fluoropolymers are present in the triblock structure:

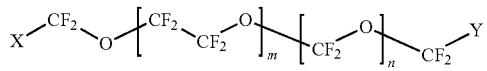

wherein:
X, Y=$CH_2$—(O—$CH_2$—$CH_2$)$_p$-T, and X and Y are independently selected;
p=6 to 50;
T is a hydroxyl or amine terminal group;
m=1 to 100; and
n=1 to 100;

(b) one or more isocyanate species, or a reacted form thereof, possessing an isocyanate functionality of 2 or greater; and (c) one or more polyol or polyamine chain extenders or crosslinkers, or a reacted form thereof.

In some embodiments, the hygroscopic material is also hardenable, either alone or in combination with the low-surface-energy polymer. For instance, a low-surface-energy polymer and a hygroscopic polymer may form a high-molecular-weight block copolymer and thus harden. In certain embodiments, the hygroscopic material assists in the curability (hardenability) of the low-surface-energy polymer.

In some embodiments, a precursor material is prepared and then dispensed (deposited) over an area of interest. Any known methods to deposit precursor materials may be employed. A fluid precursor material allows for convenient dispensing using spray coating or casting techniques over a large area, such as the scale of a vehicle or aircraft.

The fluid precursor material may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid precursor material may be rapidly sprayed or cast in thin layers over large areas (such as multiple square meters).

When a solvent or carrier fluid is present in the fluid precursor material, the solvent or carrier fluid may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), acids (such as organic acids), bases, and any mixtures thereof. When a solvent or carrier fluid is present, it may be in a concentration of from about 10 wt % to about 99 wt % or higher, for example.

The precursor material may be converted to an intermediate material or the final material using any one or more of curing or other chemical reactions, or separations such as removal of solvent or carrier fluid, monomer, water, or vapor. Curing refers to toughening or hardening of a polymeric material by cross-linking of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

The overall thickness of the final material or coating may be from about 1 μm to about 1 cm or more, such as about 10 μm, 20 μm, 25 μm, 30 μm, 40 μm, 50 μm, 75 μm, 100 μm, 500 μm, 1 mm, 1 cm, or 10 cm. Relatively thick coatings offer good durability and mechanical properties, such as impact resistance, while preferably being relatively lightweight. Domains of hygroscopic material exist throughout the material, in both planar and depth dimensions. The low-friction function is retained even after abrasion of the top layer of the material.

EXAMPLES

Example 1: Synthesis of Low-Friction Fluorinated Coating 4,4'-Methylenebis(cyclohexyl isocyanate) (HMDI), 1,4-butanediol (BD), and dibutyltin dilaurate (DBTDL) are purchased from Aldrich. Fluorolink 5147X PFPE-ethoxylated diol is purchased from Solvay Specialty Polymers.

Hydroxy-terminated poly(perfluoropolyether) (9.00 g, 3.73 mmol, Fluorolink 5147X) is placed in a 3-neck round-bottom flask that contains an inlet for argon and is equipped with an overhead stirrer (Teflon shaft and blade). While stirring, 4,4'-methylenebis(cyclohexyl isocyanate) (4.89 g, 18.66 mmol) is added to the solution and the flask is placed in an oil bath at 100° C. Dibutyltin dilaurate (0.02 wt. %) is then added to the solution using a micropipette and the reaction is allowed to proceed.

After 1 hr, the prepolymer is allowed to cool down to room temperature. The prepolymer is diluted with tetrahydrofuran (15 mL) and placed in a centrifugal mixer (Flack-Tek DAC 600).

In a separate vial, 1,4-butanediol (1.35 g, 14.98 mmol) is weighed and diluted with tetrahydrofuran (0.5 mL). The two solutions are combined in a centrifugal mixer and mixed at 2300 rpm for 15 s, creating a copolymer. The copolymer is cast from solution or sprayed using an airbrush to create a polyurethane film/coating.

The coating sample is placed on a variable-angle stage and the angle is increased until a 5-gram cylindrical mass slides along the sample surface. The sliding angle is used to determine the coefficient of friction. The coating coefficient of sliding friction is measured at 0.14.

Example 2: Synthesis of Low-Friction Fluorinated Coating 4,4'-Methylenebis(cyclohexyl isocyanate) (HMDI), 1,1,1-tris(hydroxymethyl) propane (TMP), and dibutyltin dilaurate (DBTDL) are purchased from Aldrich. Fluorolink 5147X PFPE-ethoxylated diol is purchased from Solvay Specialty Polymers.

Hydroxy-terminated poly(perfluoropolyether) Fluorolink 5147X (4.5 mmoles, 10.8 g) and HMDI (22.5 mmoles, 5.895 g) are added into a 3-neck flask equipped with a mechanical stirrer. The reaction flask is placed in a 100° C. oil bath. The reaction is carried out under argon. 3.66 mg of DBTDL is added to the mix. The reaction mixture is stirred at 100° C. for 1 hour. The reaction flask is removed from the 100° C. oil bath, and allowed to cool down before adding THF (20 mL) and TMP (12 mmoles, 1.611 g) dissolved in MEK (10 mL), creating a copolymer. The copolymer is cast from solution or sprayed using an airbrush to create a polyurethane film/coating.

The coating sample is placed on a variable-angle stage and the angle is increased until a 5-gram cylindrical mass slides along the sample surface. The sliding angle is used to determine the coefficient of friction. The coating coefficient of sliding friction is measured at 0.18.

Example 3: Synthesis of Low-Friction Fluorinated Coating 4,4'-Methylenebis(cyclohexyl isocyanate) (HMDI), 1,1,1-tris(hydroxymethyl) propane (TMP), and dibutyltin dilaurate (DBTDL) are purchased from Aldrich. Fluorolink 5158X PFPE-ethoxylated diol is purchased from Solvay Specialty Polymers.

Fluorolink 5158X (3.25 mmoles, 9.5 g) and HMDI (14.98 mmoles, 3.93 g) are added into a 2-neck flask equipped with a mechanical stirrer. The reaction flask is placed in a 100° C. oil bath. The reaction is carried out under argon. 2.3 mg of DBTDL is added to the mix. The reaction mixture is stirred at 100° C. for 1 hour. The reaction flask is removed from the 100° C. oil bath, and allowed to cool down before adding THF (10 mL) and TMP (8 mmoles, 1.074 g) dissolved in MEK (7 mL), creating a copolymer. The copolymer is cast from solution or sprayed using an airbrush to create a polyurethane film/coating.

The coating sample is placed on a variable-angle stage and the angle is increased until a 5-gram cylindrical mass slides along the sample surface. The sliding angle is used to determine the coefficient of friction. The coating coefficient of sliding friction is measured at 0.32.

Example 4: Insect Impact Testing

An insect impact tester uses compressed air to propel an insect through a hollow tube, past optical speed measurement gates, and onto a coated test panel. This system allows the insect type, impact speed, and angle of impact to be highly adjustable. The range of function of the system and results from insect impact testing are reported in this Example 4.

Insect impact testing is performed with an in-house constructed pneumatic system. The system is designed to (a) discharge small insects at an inclined substrate with a controlled impact velocity and (b) quantify the area of insect exoskeleton and hemolymph adhered to the substrate. The insect impact device is driven by 140 psi compressed air which accelerates insects towards substrates. The compressed air first passes through an air regulator which controls the air flow rate and thus the bug impact velocity. The air flow is released by a solenoid valve which, when open, acts as a trigger for bug acceleration and subsequent impact. Once the solenoid valve is opened, high-pressure air flows through the tubing assembly, into a small air storage tank, and exits via the outlet into a tube containing an insect. The air storage tank is important to allow more gradual acceleration of the insect as sudden acceleration tends to cause the insects to explode within the gun itself, rather than on the substrate. As air flows through the exit tube, the insect is caught in the air stream, exits the acceleration tube, passes through two infrared photogates that measure the insect's velocity as it exits the tubing, and impacts the substrate. The substrate is set at a fixed distance from the outlet and can be angled from perpendicular to nearly parallel to the flight path on a mechanical stage. Impact velocities range from about 40 to 120 mph. Minimal variation in impact location is observed over multiple shots with all debris contained within a 1" radius area.

To perform an impact test, a substrate is mounted, an insect is inserted through the outlet of the tube, and the solenoid valve is opened for 2 seconds to create an impact. The degree of soiling is quantified by measuring the area of insect debris via optical imaging. High contrast is required to perform the image analysis, achieved by staining the insect debris with an alcohol-based ninhydrin solution (1-5 wt %) to produce a deep purple color from the organic matter. An imaging routine then calculates the debris area. Insect debris area is compared to control surfaces consisting of bare aluminum plates, polyurethane clear coat, and Teflon sheets. All impacts reported are at 60° from normal incidence.

A fluorinated-hygroscopic copolymer network is synthesized and subsequently tested for insect-impact debris reduction. The polymer network is prepared through addition of a hygroscopic and fluorinated copolymer precursor combined with a diisocyanate to produce a prepolymer mixture. The prepolymer mixture is dispersed in solvent and 1,4-butanediol curative is added. The mixture is then sprayed onto 6061 Al coupons (2"×2") using a low-volume, low-pressure spray gun (Ampro A6034) to a thickness of approximately 4 mils.

Small (<0.25" diameter) crickets are impacted against substrates between 40-120 mph to measure the build-up of insect residue at automobile freeways speeds and aircraft take-off velocities.

Figure 2:
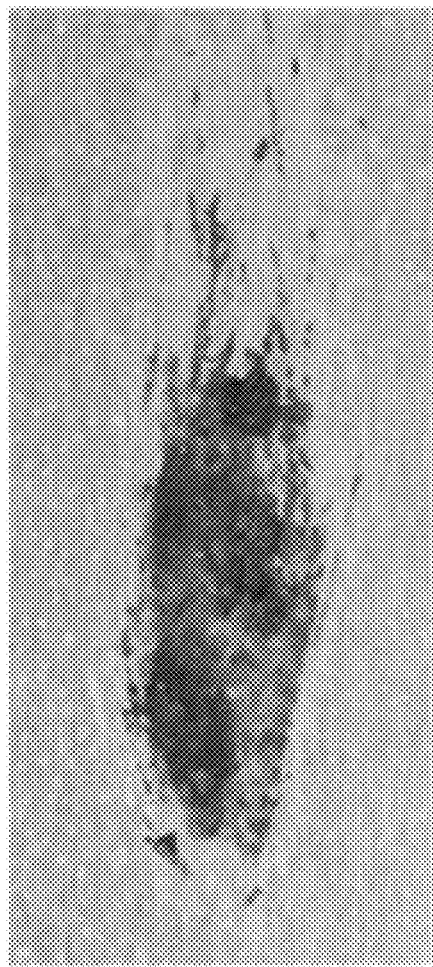
FIG. 2 depicts optical images of ninhydrin-stained insect debris on a 6061 Al control panel as well as on an exemplary fluorinated-hygroscopic copolymer coating, in Example 4 (color staining is converted to grayscale).
Figure 2:
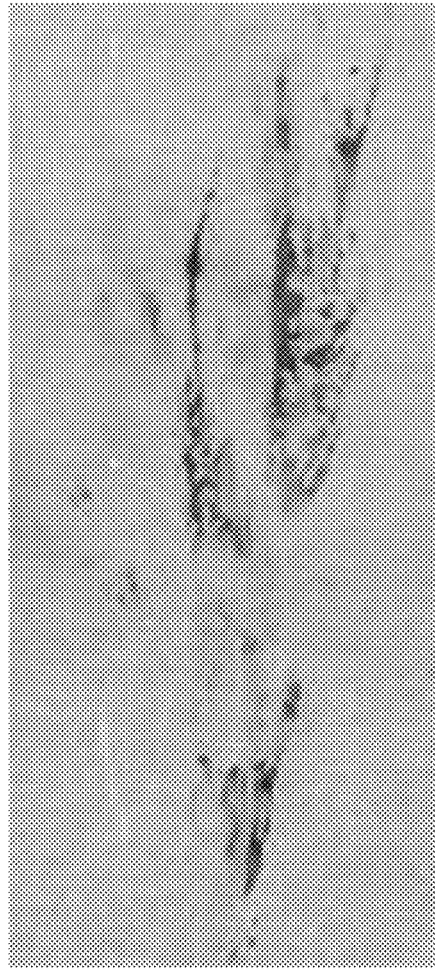

FIG. 2 depicts optical images of ninhydrin-stained insect debris on a 6061 Al control panel as well as on a fluorinated-hygroscopic copolymer coated panel. Note that color staining is converted to grayscale in this patent application. FIG. 2(a) shows an image of a control aluminum alloy 6061 test panel after a 92-mph impact with crickets and staining. FIG. 2(b) shows the same aluminum coated with the fluorinated-hygroscopic network described above after a 92-mph impact with crickets and staining. Debris on the fluorinated-hygroscopic copolymer shows less areal coverage and is not contiguous, in comparison to the continuous debris field on the 6061 Al control panel.

Figure 3:
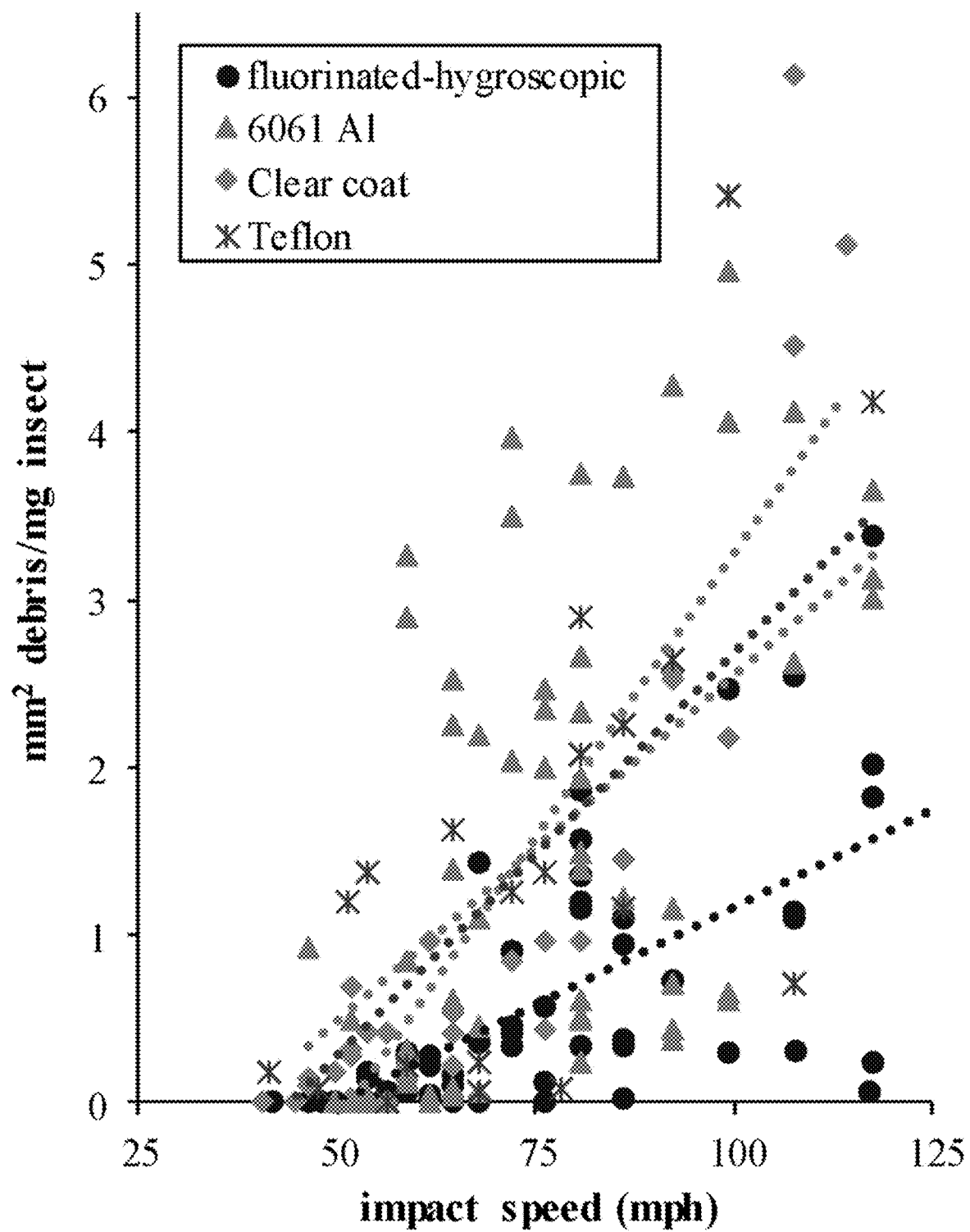
FIG. 3 summarizes insect impact coverage after impact, shown for an exemplary fluorinated-hygroscopic copolymer and three different control surfaces, according to Example 4.

In addition to Al control panels, experiments are conducted with polyurethane clear coat control panels and Teflon control panels, to compare with the experimental panels coated with fluorinated-hygroscopic copolymer. The debris coverage is quantified with an optical analysis routine. FIG. 3 summarizes insect impact coverage after impact, shown for the fluorinated-hygroscopic copolymer and the three different control surfaces. The insect debris area is normalized to the insect mass. The dotted lines are linear fits to the data intended as a guide to the eye.

According to FIG. 3, a reduction in insect debris areal coverage after 40-120 mph impact speeds is shown for fluorinated-hygroscopic copolymer coated panels as compared to 6061 Al control panels, polyurethane clear coat control panels, and Teflon control panels. Linear fits illustrate average debris amounts. The linear fits for all control panels are similar and are approximately twice (in measured area) the debris values from the fluorinated-hygroscopic copolymer. It is hypothesized that the debris reduction observed for the fluorinated-hygroscopic copolymer is due to the presence of an absorbed water layer created by the hygroscopic material.

In summary, in this Example 4, an insect impact system is constructed and the measured debris is 2× greater on three control surfaces compared to a fluorinated-hygroscopic copolymer coating. Without being limited by theory or speculation, we hypothesize that the hygroscopic material in the fluorinated-hygroscopic copolymer creates an absorbed water layer that acts as a lubricant and reduces insect debris.

Vehicle-based cameras for surrounding awareness will require lens coatings that will inhibit soiling in order to function. Once soiled, the camera will lose effectiveness and eventually cease functioning. The coatings/surfaces described herein may be used as camera lens coatings, and may be transparent.

Aircraft lose efficiency from disruption of laminar flow when insect and particulate debris collect on the aircraft wings. This invention provides materials that reduce the adhesion of insect and particulate debris on aircraft surfaces.

Other practical applications for the present invention include, but are not limited to, vehicle windows, optical lenses, filters, instruments, sensors, eyeglasses, cameras, satellites, and weapon systems. For example, automotive applications can utilize these coatings to prevent the formation of debris on back-up camera lenses or back-up sensors. The principles taught herein may also be applied to self-cleaning materials, anti-adhesive coatings, corrosion-free coatings, etc.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A material comprising:
   a substantially continuous matrix containing a first component; and
   a plurality of inclusions containing a second component, wherein said inclusions are uniformly and intimately dispersed within said matrix;
   wherein one of said first component or said second component is a low-surface-energy fluoropolymer having a surface energy between about 5 mJ/m$^2$ to about 50 mJ/m$^2$, and the other of said first component or said second component is a hygroscopic material that is covalently connected to said fluoropolymer in a triblock copolymer,
   wherein said material forms a lubricating surface layer in the presence of humidity, and wherein said material is characterized by a coefficient of friction less than 0.2,
   wherein said fluoropolymer is perfluoropolyether,
   wherein said hygroscopic material is poly(ethylene glycol), and
   wherein said triblock copolymer is

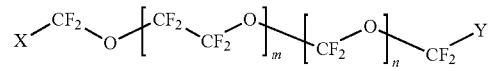

wherein:
X, Y=CH$_2$—(O—CH$_2$—CH$_2$)$_p$-T, and X and Y are independently selected;
p=6 to 50;
T is a hydroxyl or amine terminal group;
m=1 to 100; and
n=1 to 100.

2. The material of claim 1, wherein said continuous matrix further contains (i) one or more isocyanate species possessing an average isocyanate functionality of about 2 or greater, or a reacted form thereof; and (ii) one or more polyol or polyamine chain extenders or crosslinkers possessing an average functionality of about 2 or greater, or a reacted form thereof.

3. The material of claim 2, wherein said isocyanate species are selected from the group consisting of 4,4'-methylenebis(cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, and combinations or derivatives thereof.

4. The material of claim 2, wherein said polyol or polyamine chain extenders or crosslinkers are selected from the group consisting of 1,3-butanediol, 1,4-butanediol, 1,3-propanediol, 1,2-ethanediol, diethylene glycol, triethylene glycol, tetraethylene glycol, propylene glycol, dipropylene glycol, tripropylene glycol, neopentyl glycol, 1,6-hexanediol, 1,4-cyclohexanedimethanol, ethanol amine, diethanol amine, methyldiethanolamine, phenyldiethanolamine, glycerol, trimethylolpropane, 1,2,6-hexanetriol, triethanolamine, pentaerythritol, ethylenediamine, 1,3-propanediamine, 1,4-butanediamine, diethyltoluenediamine, dimethylthiotoluenediamine, isophoronediamine, diaminocyclohexane, N,N,N',N'-tetrakis(2-hydroxypropyl) ethylenediamine, and homologues, derivatives, or combinations thereof.

5. The material of claim 2, wherein said one or more polyol or polyamine chain extenders or crosslinkers possess an average functionality of about 3 or greater.

6. The material of claim 1, wherein said low-surface-energy polymer or said hygroscopic material is surface-treated.

7. The material of claim 1, said material further comprising one or more additional components selected from the group consisting of a particulate filler, a pigment, a dye, a plasticizer, a flame retardant, a flattening agent, and a substrate adhesion promoter.

8. The material of claim 7, wherein said particulate filler is selected from the group consisting of silica, alumina, silicates, talc, aluminosilicates, barium sulfate, mica, diatomite, calcium carbonate, calcium sulfate, carbon, wollastonite, and combinations thereof; and wherein said particulate filler is optionally surface-modified with a compound selected from the group consisting of fatty acids, silanes, alkylsilanes, fluoroalkylsilanes, silicones, alkyl phosphonates, alkyl phosphonic acids, alkyl carboxylates, alkyldisilazanes, and combinations thereof.

9. The material of claim 1, wherein said material is characterized by a water absorption capacity of at least 10 wt % water based on total weight of said material.

10. The material of claim 1, wherein said material is characterized by a surface contact angle of water of greater than 90°.

11. The material of claim 1, wherein said material is optically transparent.

* * * * *